US010794527B2

(12) United States Patent
Barmatov et al.

(10) Patent No.: US 10,794,527 B2
(45) Date of Patent: Oct. 6, 2020

(54) CORROSION INHIBITION

(71) Applicant: SCHLUMBERGER TECHNOLOGY CORPORATION, Sugar Land, TX (US)

(72) Inventors: Evgeny Borisovich Barmatov, Cambridge (GB); Trevor Lloyd Hughes, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/507,791

(22) PCT Filed: Aug. 26, 2015

(86) PCT No.: PCT/US2015/046950
§ 371 (c)(1),
(2) Date: Mar. 1, 2017

(87) PCT Pub. No.: WO2016/036557
PCT Pub. Date: Mar. 10, 2016

(65) Prior Publication Data
US 2017/0234475 A1  Aug. 17, 2017

(30) Foreign Application Priority Data
Sep. 1, 2014 (GB) .................... 1415429.8

(51) Int. Cl.
C09K 8/54 (2006.01)
F16L 58/10 (2006.01)
C23F 11/04 (2006.01)
E21B 41/02 (2006.01)
C23F 11/173 (2006.01)
E21B 43/25 (2006.01)
F16L 101/16 (2006.01)

(52) U.S. Cl.
CPC ............ F16L 58/1009 (2013.01); C09K 8/54 (2013.01); C23F 11/04 (2013.01); C23F 11/173 (2013.01); E21B 41/02 (2013.01); C09K 2208/32 (2013.01); E21B 43/25 (2013.01); F16L 2101/16 (2013.01)

(58) Field of Classification Search
CPC ........ C09K 8/54; C09K 2208/32; C09K 8/74; C09K 8/582; C09K 8/528; C09K 8/52; C09K 8/72; C09K 8/035; C09K 2208/20; C09K 2208/26; C09K 5/047; C09K 8/524; C09K 8/584; C09K 8/725; C09K 8/82; C09K 2208/22; C09K 8/36; C09K 8/56; C09K 8/602; C09K 8/62; C09K 8/64; C09K 8/78; C09K 8/90; C09K 13/00; C09K 2208/02; C09K 2208/10; C09K 2208/12; C09K 8/04; C09K 8/12; C09K 8/24; C09K 8/38; C09K 8/40; C09K 8/42; C09K 8/508; C09K 8/512; C09K 8/518; C09K 8/536; C09K 8/57; C09K 8/588; C09K 8/594; C09K 8/68; C09K 8/703; C09K 8/76; C09K 8/80; C09K 8/86; C09K 8/92; C09K 8/94; E21B 41/02; E21B 43/25; E21B 17/01; E21B 37/06; E21B 43/20; E21B 43/16; E21B 43/267; E21B 43/28; E21B 43/26; E21B 47/12
See application file for complete search history.

(56) References Cited

U.S. PATENT DOCUMENTS

| 3,773,465 | A |   | 11/1973 | Keeney et al. |
| 4,214,924 | A |   | 7/1980 | Piucci |
| 4,413,370 | A |   | 11/1983 | Payne et al. |
| 4,498,997 | A |   | 2/1985 | Walker |
| 4,522,658 | A | * | 6/1985 | Walker ............... C09K 8/54 |
|           |   |   |        | 148/248 |
| 4,784,796 | A |   | 11/1988 | Treybig et al. |
| 5,120,471 | A |   | 6/1992 | Jasinski et al. |
| 5,326,400 | A |   | 7/1994 | Sagawa |
| 5,763,368 | A |   | 6/1998 | Brezinski |
| 5,830,952 | A |   | 11/1998 | Pedersen et al. |
| 7,717,056 | B2 |  | 5/2010 | Horn |
| 8,359,996 | B2 |  | 1/2013 | Horn |

(Continued)

FOREIGN PATENT DOCUMENTS

EP  0713048 A1  5/1996
FR  2728652 A1  6/1996
(Continued)

OTHER PUBLICATIONS https://www.glossary.oilfield.slb.com/Terms/c/casing.aspx downloaded on Aug. 15, 2018.*

(Continued)

Primary Examiner — Kumar R Bhushan

(57) ABSTRACT

A method of inhibiting corrosion of metal which will be in contact with aqueous, and possibly acidic, solution comprises contacting the metal with a corrosion inhibiting composition containing more than 30% by weight of one or more organic corrosion inhibiting constituents which are water-insoluble hydrophobic material, and a corrosion inhibitor which contains one or more polymerisable groups containing double or triple bonded carbon, before contacting the metal with the aqueous solution. The method may be used to protect coiled tubing used for matrix acidizing of an oil well by propelling a slug of the corrosion inhibiting composition along the coiled tubing before pumping acid through the tubing.

16 Claims, 4 Drawing Sheets

(56) References Cited

U.S. PATENT DOCUMENTS

| | | | |
|---|---|---|---|
| 2002/0188070 A1 | 12/2002 | Tsuboniwa et al. | |
| 2006/0108110 A1 | 5/2006 | McKeen | |
| 2007/0003371 A1* | 1/2007 | Yemington | F16L 55/46 405/154.1 |
| 2008/0146464 A1* | 6/2008 | Malwitz | C09K 8/54 507/240 |
| 2009/0032057 A1 | 2/2009 | McCormick et al. | |
| 2012/0311923 A1* | 12/2012 | Rawat | C10L 1/14 44/308 |
| 2016/0010217 A1 | 1/2016 | Hughes et al. | |

FOREIGN PATENT DOCUMENTS

| | | |
|---|---|---|
| WO | WO2005123981 A1 | 4/2008 |
| WO | WO2014136012 A1 | 9/2014 |

OTHER PUBLICATIONS

Acetylenic alcohol product data sheet downloaded on Apr. 30, 2019.*

Aramaki, K. et al., "Spectroscopic Investigations on the Inhibition Mechanism of Propargyl Alcohol for Iron Corrosion in Hydrochloric Acid at Elevated Temperatures", Corrosion, 1997, 53(4), pp. 319-326.

Growcock, F. B. et al., "The Inhibition of Steel Corrosion in Hydrochloric Acid with 3-phenyl-2-propyn-1-ol", Corrosion Science, 1988, 28(4), pp. 397-410.

Growcock, F. B. et al., "Kinetics of Steel Corrosion in Hydrochloric Acid Inhibited with trans-Cinnamaldehyde", Journal of the Electrochemical Society, 1988, 135(4), pp. 817-823.

Frenier, W. W. et al., "Mechanisims of Corrosion Inhibitors Used in Acidizing Wells", SPE Production Engineering, 1988, 3(4) pp. 584-590.

Barmatov, E. et al., "Resarch on Corrosion Inhibitors for Acid Stimulation", NACE International, 2012, 20 pages.

Stern, M. et al., "Electrochemical Polarization: I. Theoretical Analysis of the Shape of Polarization Curves", Journal of the Electrochemical Society 1957, 104, pp. 56-63.

Stern, M. A Method for Determining Corrosion Rates From Linear Polarization Data, Corrosion, 1958, 14(9), pp. 440t-444t.

Combined Search and Examination Report of GB Application No. 1415429.8 dated Jun. 9, 2015, 7 pages.

Search Report and Written Opinion of International Patent Application No. PCT/US2015/046950, dated Nov. 30, 2015, 13 pages.

International Preliminary Report on Patentability of International Patent Application No. PCT/US2015/046950, dated Mar. 16, 2017, 9 pages.

* cited by examiner

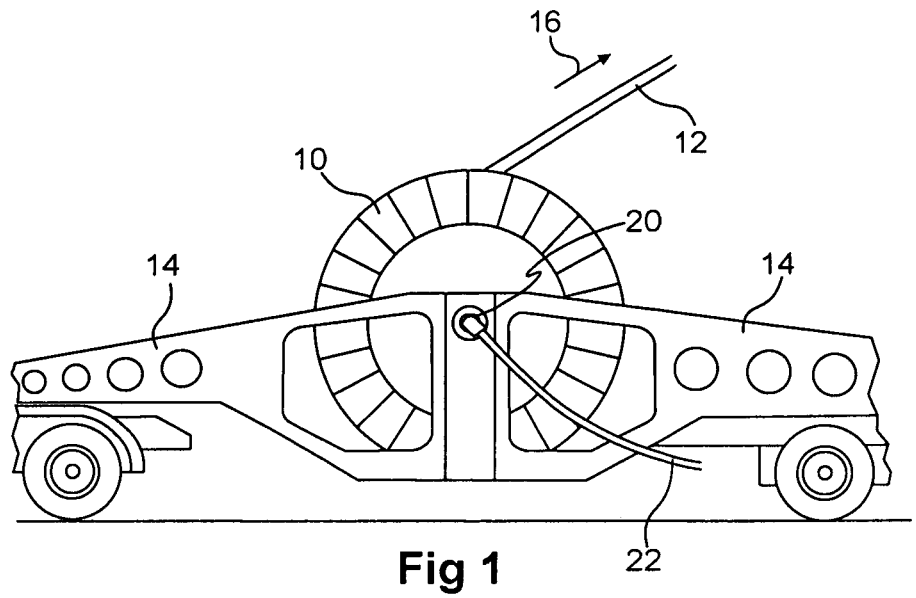
Fig 1
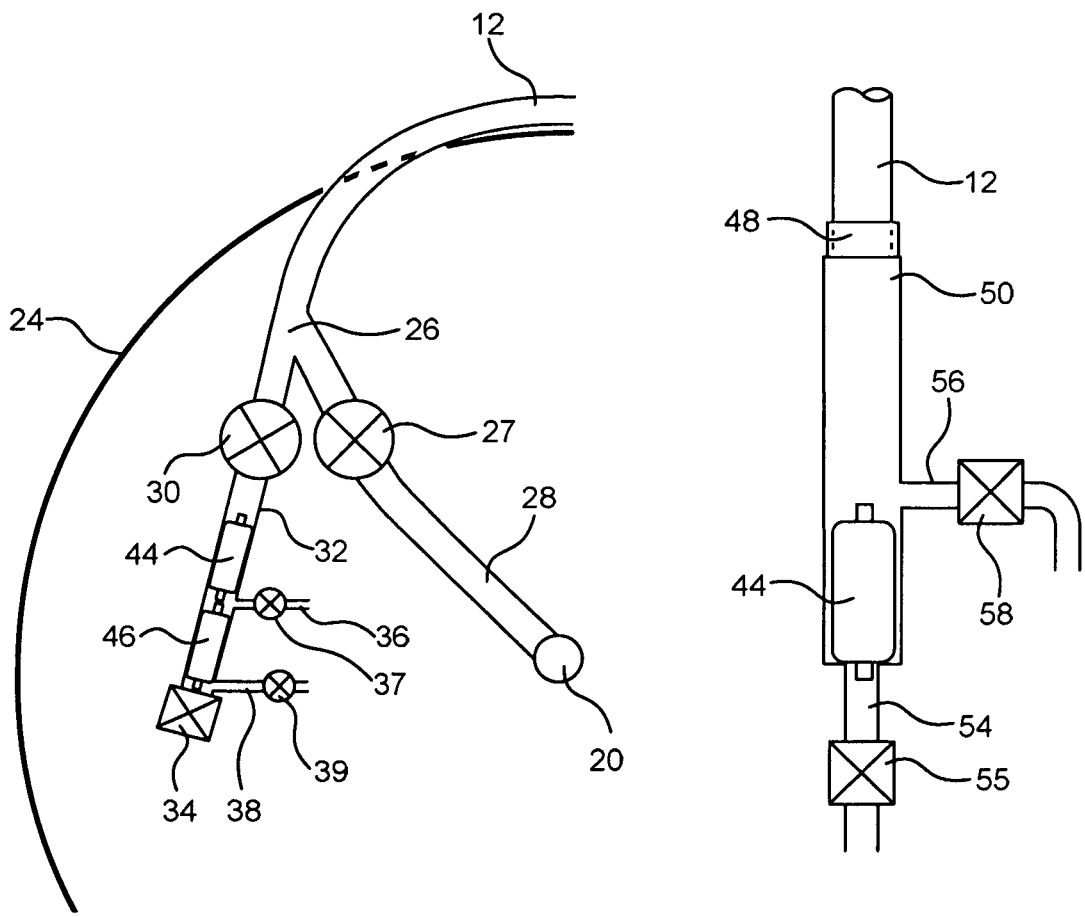
Fig 2          Fig 3

CORROSION INHIBITION

BACKGROUND

There are numerous circumstances where it is desired to protect steel from corrosion by acidic material to which it is exposed. These include the protection of steel exposed to an aqueous acidic liquid such as when steel tubing is used to convey a flow of aqueous liquid.

One industry which has a need for protection of steel against corrosion is oil and gas exploration and production. Steel tubulars used in a borehole may be exposed to an acidic liquid mixture and so also may steel pipelines used to carry produced oil and gas.

The technique of matrix acidizing in which the producing formation is treated with acid to stimulate production involves deliberate exposure of borehole steel to acid. This operation may be performed with coiled tubing which is run into a borehole and then used to convey acid down the borehole to the formation. When the operation comes to an end, the steel casing in the borehole and the exterior of the coiled tubing can be exposed to so-called unspent acid flowing back with formation fluids towards the surface.

A conventional approach to the protection of steel against corrosion by an acidic liquid is to contact the steel with a corrosion inhibitor. For example, when conveying an acidic liquid through steel tubing, it is conventional to add a corrosion inhibitor to the flow of liquid as mentioned in many documents including for example U.S. Pat. Nos. 3,773,465, 4,498,997 and 5,120,471.

Organic inhibitors adsorb on the metal surface. Adsorbed inhibitor(s) may influence the rate of corrosion by one or more of several mechanisms: (i) by forming a physical barrier film which restricts the diffusion of species to/from the metal surface, (ii) by blocking anodic and/or cathodic reaction sites directly, (iii) by interacting with corrosion reaction intermediates adsorbed on the surface and (iv) by influencing the electrical double layer that forms at the metal/solution interface.

Adsorption may be physi-sorption which is the result of electrostatic attractive forces between inhibiting organic ions or dipoles and the electrically charged surface of the metal. The surface charge of the metal is due to the electric field at the outer Helmholtz plane of the electrical double layer existing at the metal/solution interface.

Another possibility is that adsorption is by chemi-sorption, which takes place more slowly than electrostatic adsorption and with a higher activation energy. Chemisorption involves electron transfer from electron-rich sites within the structure of the inhibitor molecule(s) to vacant low energy orbitals in the metal. Typically, such electron-rich sites within an inhibitor molecule are heteroatoms with lone pair(s) of electrons or are multiple bonds and aromatic rings so that covalent bonds have electrons in $\pi$-orbitals. Because activation energy is required, to bring about chemisorption, the extent of chemi-sorption and therefore the efficacy of corrosion inhibition may increase with temperature. It is known that chemi-sorbed acetylenic compounds can react to form polymeric inhibitor films. Such reaction/polymerisation is surface-catalysed.

Corrosion inhibitors are frequently marketed as a liquid mixture containing materials which inhibit corrosion and other materials which enhance inhibition, even though these other materials do not function as corrosion inhibitors (or are less efficacious) if used alone. In some cases these mixtures are proprietary and their exact composition is not made public.

A mixture which contains a chemi-sorbing corrosion inhibitor may also include non-ionic or cationic surfactants to assist deposition on steel, quaternary nitrogen compounds, amines (which will protonate to quaternary nitrogen under acidic conditions) and organic solvent. Some oilfield corrosion inhibitor products considered to provide good inhibition performance at high temperatures are mixtures which make use of a synergistic combination of an amine and an acetylenic alcohol.

Materials used in a corrosion inhibiting mixture may include materials which are considered to damage an oil reservoir by depositing on the reservoir formation. In particular surfactants in a corrosion inhibiting mixture may assist deposition of corrosion inhibitor on steel, yet be regarded as potentially reducing production from a reservoir. Consequently, when working on a wellbore, there is a conflict between a desire to protect steel tubing by means of inhibitor compositions and a desire to protect the reservoir from exposure to such inhibitor compositions.

The corrosion inhibiting effect of an inhibitor or corrosion inhibiting mixture can be tested in various ways. One direct method of testing is to use a test piece which is a sample of the steel to be protected, customarily referred to as a "coupon". This coupon is exposed for a measured length of time to an acidic solution containing a known concentration of corrosion inhibitor. The loss in weight of the coupon is measured and expressed as weight loss per unit surface area. The coupon is also examined for localised pitting and the extent of pitting may be expressed as a numerical value: the so-called pitting index.

There are a number of other ways to measure corrosion by an acidic solution. These include linear polarization resistance measurement which was first proposed by M Stern and A L Geary in "Electrochemical Polarization: I. A Theoretical Analysis of the Shape of Polarization Curves" in J. Electrochem. Soc. Vol 104 pp 56-63 (1957) and followed by Stern: "A Method For Determining Corrosion Rates From Linear Polarization Data" in Corrosion, Vol. 14, No. 9, 1958, pages 440t-444t. In such tests a piece of the steel is used as an electrode. This electrode may be subjected to dynamic flow conditions, by providing the electrode in the form of a rotating disc, cylinder or cage, so as to simulate flow of the corrosive solution over the steel.

When steel is going to be exposed to a flow of an acidic composition, it is normal practice to test coupons of the steel with various concentrations of corrosion inhibitor in samples of the acidic composition. A concentration of inhibitor which produces an acceptably low weight loss and pitting index is identified and this concentration of inhibitor is then maintained in the flow of acidic composition to which the steel is exposed, throughout the period of exposure.

SUMMARY

This summary is provided to introduce a selection of concepts that are further described below. This summary is not intended to be used as an aid in limiting the scope of the subject matter claimed.

We have now found that with certain corrosion inhibitors and corrosion inhibiting mixtures, it is not necessary to maintain a uniform concentration of the inhibitor throughout the period of exposure. We disclose here a novel method for inhibiting corrosion of steel or other metal which will be in contact with an aqueous solution. In this novel method, the composition has certain required characteristics and, the metal is treated with the corrosion inhibiting competition before exposure to the aqueous solution.

Disclosed now is a method of inhibiting corrosion of metal exposed to aqueous solution, comprising contacting the metal with a corrosion inhibiting composition containing one or more materials which individually or together provide a water-insoluble hydrophobic material, and
a corrosion inhibitor which contains one or more polymerisable groups containing double or triple bonded carbon, so as to form a coating of the composition on the metal surface, before contacting the metal with the aqueous solution.

The surface which is to be protected can thus be treated with a corrosion inhibiting composition before exposure to an aqueous solution expected, in the absence of corrosion protection, to bring about corrosion. This may be an acidic aqueous solution and may be an acidic solution with a pH of 2 or less, possibly pH zero or less. Forming the coating and contacting the coated metal with the aqueous solution may be successive steps in a work job using coiled tubing. Thus contacting the coated metal with the acid may take place within 8 hours, possibly within 4 hours or even less such as within two hours of forming the coating on the metal. The work job may be a job in which coiled tubing is used to deliver aqueous acid down a well bore, as for instance a matrix acidizing job.

As stated above, the corrosion inhibiting composition contains one or more materials providing two characteristic requirements of that composition. One requirement is a material which is hydrophobic. This may be a water-insoluble material. It may be an organic substance and may be liquid. The other requirement is a material which contains polymerisible groups in which there is double or triple bonded carbon. Again this may be an organic substance. Both of these characteristic requirements of the composition may be provided by a polymerisable material which is hydrophobic. However, it is possible to use two materials one of which is a hydrophobic substance and the other of which is polymerisible to act as a corrosion inhibitor. Some overlap of properties is also possible: for instance a composition might contain a corrosion inhibitor material which is a hydrophobic liquid but also contain additional material which is a simple hydrophobic oil.

Without limitation as to theory, the inventors believe that the composition deposits as a hydrophobic film on the metal. Polymerisation of the polymerisible corrosion inhibitor in this film makes it into a more durable protective film on the surface. The polymerisation may be brought about or assisted by the subsequent exposure to acid.

The hydrophobic material (or materials) in the corrosion inhibiting composition may be present at a concentration of at least 20 wt % and possibly at least 50 wt % of the composition. The composition may be sufficiently hydrophobic that it does not mix with water or aqueous acid.

The composition may be substantially non-aqueous. It does not have to be anhydrous, but the content of water, if any, may be less than 50 weight % of the composition and possibly not more than 20 wt % or 10 wt % of the composition.

A corrosion inhibitor which contains polymerisable groups may be a chemical compound which is able to reduce the rate of corrosion of steel when added to a solution of a mineral acid, such as hydrochloric acid, with no other corrosion inhibitor present. The corrosion inhibiting composition may possibly contain polymerisable corrosion inhibitor in a concentration of at least 2 wt %, possibly at least 5 wt %. The concentration of polymerisable corrosion inhibitor may possibly extend up to 25 wt %, 40 wt % or even more. The corrosion inhibiting composition may possibly contain hydrophobic liquid in a concentration of at least 30 wt % possibly at least 50 wt %.

Polymerisable corrosion inhibitors may be water-soluble (for example propargyl alcohol) or water-insoluble (for example a long chain acetylenic alcohol). If the corrosion inhibiting composition contains a polymerisable corrosion inhibitor which is a water-insoluble hydrophobic material, this may possibly be present in a concentration of at least 30 wt % or at least 50 wt % of the composition.

If the hydrophobic liquid is not itself a corrosion inhibitor it may be an oil such as a hydrocarbon oil or a water insoluble ester, such as an ester of an acid containing at least 8 carbon atoms or of an alcohol containing at least 8 carbon atoms. This hydrophobic liquid may have a boiling temperature, at atmospheric pressure, of at least 100° C.

The corrosion inhibiting composition is formulated and applied as liquid so that it can form a coating. The coating which it forms is a hydrophobic coating but it may possibly be hydrophilic as initially deposited, becoming hydrophobic as a volatile hydrophilic solvent such as methanol evaporates from it.

If the corrosion inhibiting composition has a measurable pH, for instance if it contains some water or an organic alcohol, its pH may be above zero and may be above pH2.

The corrosion inhibiting composition may be applied to a metal surface by exposing the metal surface to a volume of the composition which is more than the amount which provides the coating and then removing the surplus volume of composition. The thickness of coating which remains on the surface may be controlled by a tool which is passed over the surface.

After application of the corrosion inhibiting composition to the metal, a flow of gas over the metal may be used to remove volatile solvent. Flow of gas may also remove or redistribute any excess coating composition on the metal surface.

The aqueous solution to which the metal is subsequently exposed may contain some corrosion inhibitor which may serve to maintain the film which has deposited. The concentration of corrosion inhibitor in the aqueous solution may be lower than the concentration which would be needed without the initial exposure to a corrosion inhibitor as specified above. This can be beneficial when treating a well bore because there is a reduction in the amount of corrosion inhibitor which can potentially reach the reservoir formation.

The process and corrosion inhibiting composition may be used in a diverse range of situations. One possibility is application of the inhibiting composition to the interior of tubing which is subsequently used to convey acid. A volume of corrosion inhibiting composition may be pumped along the tubing and may be made to flow along the tubing as a slug of liquid filling the cross-section of the tubing. At least one pig maybe pumped along the tubing with the composition so as to keep the liquid composition filling the cross section.

A slug of liquid corrosion inhibiting composition may travel between two pigs (devices which can be propelled along a pipeline) and be impelled along the tubing by pressure acting against the trailing pig. The tubing may be coiled tubing and more specifically it may be coiled tubing used in a matrix acidizing procedure to stimulate a hydrocarbon well.

The pig at the trailing end of the slug of corrosion inhibiting composition may be configured to push the slug ahead of it while leaving a coating of the composition on on the interior of the tubing behind the trailing pig.

If the tubing is coiled on a reel, a pig at the leading end may act to keep the corrosion inhibiting composition in the form of a slug filling the cross section of the tubing. However, if the slug of liquid is long enough, such as longer than the circumference of the reel, it may be possible to propel the slug with a trailing pig without requiring a leading pig.

The slug of liquid and the pig(s) may be propelled along the tubing by gas or liquid under pressure behind the trailing pig.

BRIEF DESCRIPTION OF DRAWINGS

FIG. 1 shows a reel of coiled tubing on a road vehicle;

FIG. 2 shows apparatus at the upper end of the coiled tubing;

FIG. 3 shows apparatus temporarily attached to the downhole end of the coiled tubing, while still at the surface;

DETAILED DESCRIPTION

Figure 4:
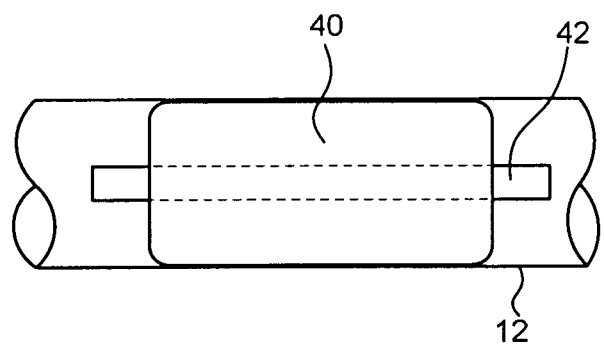
FIGS. 4, 5 and 6 show possible forms of pig.

As mentioned above, the present disclosure provides a method for corrosion protection of metal exposed to acid. The metal may be steel and may take the form of tubing or a pipeline. The first stage of the method disclosed here is to expose the metal to a composition which provides a hydrophobic material and a polymerisable corrosion inhibitor. FIGS. 1 to 3 show a possible procedure for applying the corrosion inhibitor to coiled tubing and FIG. 4 shows the tubing in use.

FIG. 1 shows a reel 10 of coiled tubing 12 carried on a road vehicle 14 (only part of which is seen in the figure). When required for use, the tubing is drawn off in the direction of arrow 16 and taken over a guide 18 (the so called gooseneck) which turns the tubing to descend vertically into a borehole as seen in FIG. 4. An inlet 20 to the coiled tubing is provided on the reel axis. This can be connected to a hose 22 as shown or rigid pipework.

FIG. 2 shows a possible arrangement within the reel 10. Part of the reel's cylindrical surface onto which the tubing is wound is indicated at 24. The inner end portion of the coiled tubing 12 extends through the surface 24 and is connected to a junction 26. One branch 28 leads from the junction 26 through a valve 27 to the axial inlet 20 on the reel axis. The other branch from the junction 26 goes through a full-bore ball valve 30 to a chamber 32 used for the injection of pigs.

Two pigs 44, 46 are shown in the chamber 32 in FIG. 2. These pigs have the construction shown in FIG. 4. Each pig has a cylindrical body 40 formed of a material with some resilience and flexibility, possibly a closed cell polymer foam, surrounding and secured to a central rod 42. The body 40 is dimensioned to fill the cross section of the coiled tubing and touch its inside walls.

When treating the coiled tubing with corrosion inhibiting composition the outlet (i.e. downhole) end of the tubing furthest from the reel is temporarily connected at a joint 48 to a pig catcher shown in FIG. 3. This has a body 50 which has larger diameter than the coiled tubing 12. The body 50 has an outlet 52 which is of smaller diameter than the coiled tubing and includes a valve 54. The body also has a side outlet 56 with a valve 58.

The procedure is as follows. While the coiled tubing 12 is empty, its outlet (i.e. downhole) end is attached to the pig catcher shown in FIG. 3. Two pigs 44, 46 are inserted into the chamber 32 through its inlet 34.

Corrosion inhibiting composition is pumped into the chamber 32 through inlet 36 so that the composition enters the chamber 32 between the leading pig 44 and the trailing pig 46 and pushes the leading pig through the ball valve and the junction into the coiled tubing 12. This pumping in of corrosion inhibiting composition through inlet 36 is continued until the leading pig has been propelled for a chosen distance along the coiled tubing, perhaps half a turn around the reel. There is then a slug of corrosion inhibiting composition filling a length of the coiled tubing between the leading pig 44 and the trailing pig 46.

When the desired amount of corrosion inhibiting competition has been introduced, the inlet valve 37 is closed and a drive fluid is pumped in through inlet 38 so as to be introduced behind the trailing pig 46, pushing it through the ball valve and the junction into the coiled tubing 12 on the reel 10. At this stage the coiled tubing contains, near its surface end, a slug of the corrosion inhibiting composition between the leading pig 44 and the trailing pig 46. The drive fluid continues to be pumped in behind the trailing pig 46 in order to propel the pigs and the slug of corrosion inhibiting composition along the coiled tubing towards the pig catcher of FIG. 3 at the far end of the coiled tubing. As the slug of corrosion inhibiting composition passes along the tubing 12 it leaves a coating on the interior of the coiled tubing.

The leading pig 44 is dimensioned to be propelled along the tubing by pressure behind it. The body of the pig may have a diameter slightly larger than the internal diameter of the tubing and be slightly compressed by the tubing so that there is a seal between the body of the pig and the tubing.

As the trailing pig is propelled along the tubing, the body of the pig allows a quantity of the corrosion inhibiting composition to remain as a coating on the interior of the tubing behind the pig. To allow such coating to take place, the body of the trailing pig may have a diameter which is slightly smaller than the body of the leading pig. Another possibility is that the body of the trailing pig is porous or has a porous outer layer so as to allow a coating layer to remain on the tubing interior as the trailing pig 46 passes along the tubing 12.

When the leading pig 44 reaches the pig catcher, it cannot pass through because the outlet 52 is too small. It is retained in the body 50 as shown and corrosion inhibiting composition which has not been deposited on the interior of the coiled tubing flows out through the outlet 56 and is collected for re-use. This continues until the trailing pig arrives in the body 50 of the pig catcher.

The drive fluid used to propel the pigs and the slug of composition between them may be any convenient fluid. One possibility is brine. Another possibility is nitrogen gas. If gas is used as the drive fluid, the flow of gas may be continued for a time after the trailing pig 46 reaches the catcher, to blow out any solvent which evaporates from the deposited coating.

Figure 7:
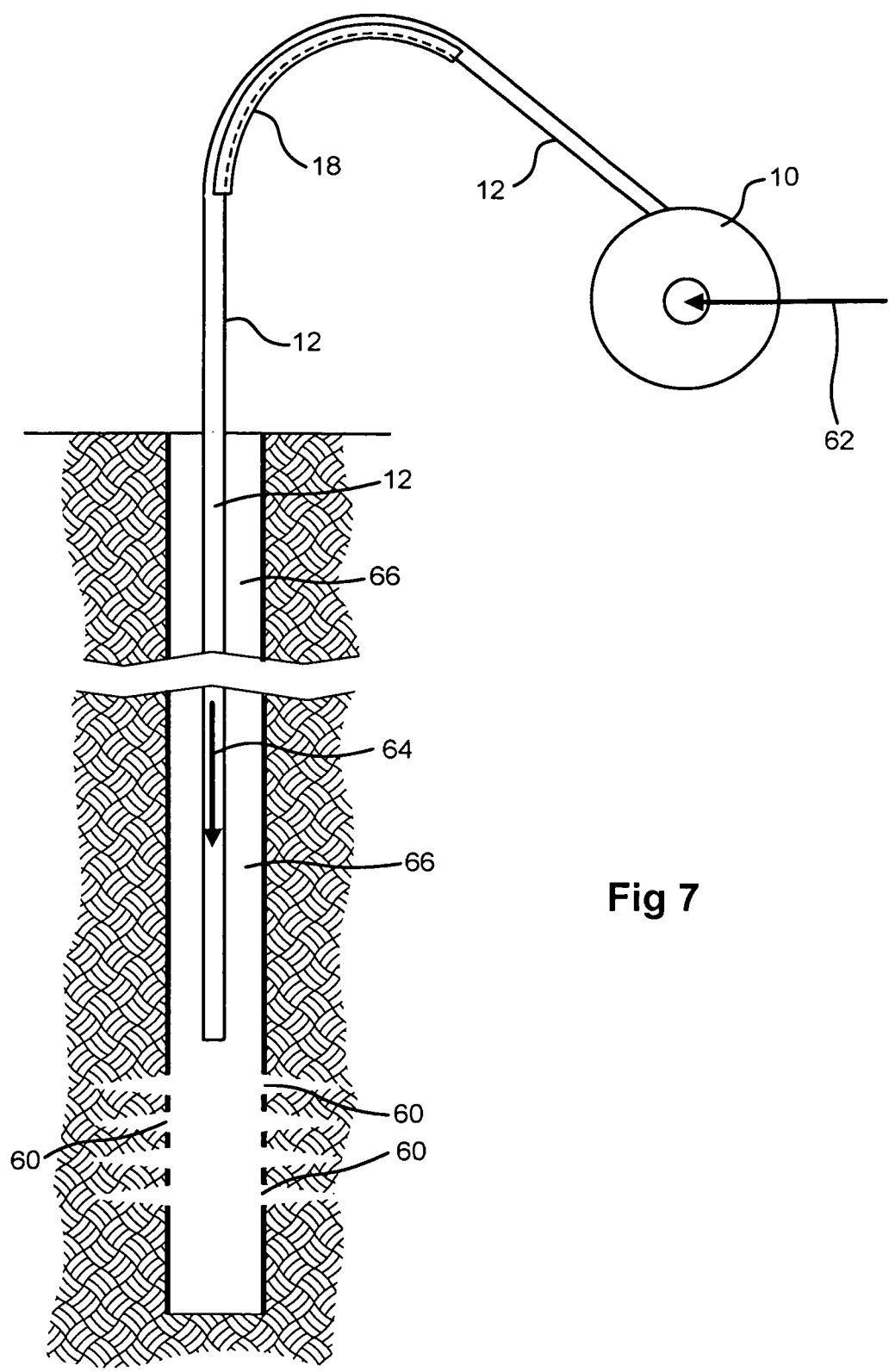
FIG. 7 shows coiled tubing inserted into a wellbore.

When both pigs have reached the catcher and any continuing flow of gas has been completed, the pig catcher and the pigs in it are detached from the end of the coiled tubing 12. Then the tubing 12 is lowered into the well as illustrated by FIG. 7 until the downhole end of the tubing reaches the perforations 60 which give access to the formation outside the well casing. Acid is pumped into the coiled tubing 12 through its axial inlet as diagrammatically indicated by arrow 62 and down the coiled tubing 12 in the direction of arrow 64 to the formation which is to be treated. Displaced fluid returns to the surface via the annulus 66 around the tubing 12.

Thus, by means of this procedure the interior of the coiled tubing is first exposed to corrosion inhibiting composition which travels along the tubing as a slug of the composition filling the cross section of the tubing 12 and leaving a coating on the tube wall. Subsequently the interior of the coiled tubing is exposed to strong acid which is delivered through the tubing 12.

Figure 5:
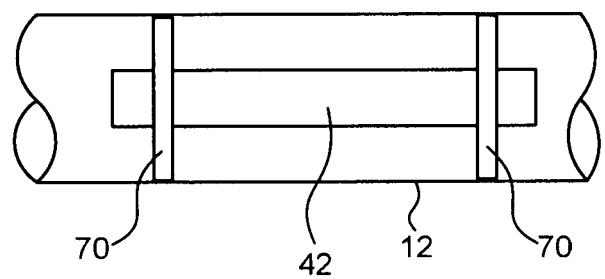

Pigs may take a variety of forms. FIG. 5 shows a pig in which discs 70 are secured to the central rod 42 close to each end. A leading pig may have these discs close to each end. These discs may be slightly larger than the interior of the tubing 12 so as to seal against it. In the case of a trailing pig these discs 70 are dimensioned to allow a coating layer to remain on the tubing interior as the trailing pig 46 passes along the tubing 12.

U.S. Pat. No. 4,413,370 (the disclosure of which is incorporated herein by reference) discloses a pig made in one piece, with cup-shaped parts around a central rod. Such a pig may be used here, in particular as a leading pig. U.S. Pat. Nos. 5,326,400 and 7,717,056 (the disclosures of which are also incorporated herein by reference) disclose pigs intended to apply a coating to tubing and pigs of these designs may be used as a trailing pig.

Figure 6:
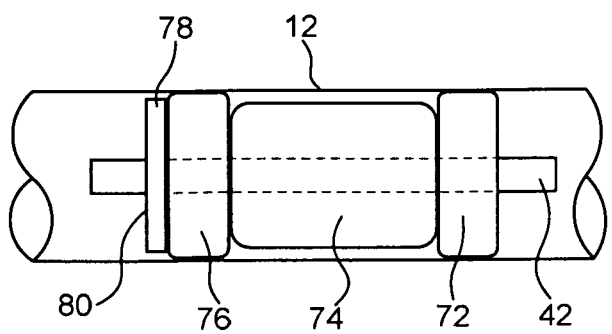

FIG. 6 shows a further possibility for a trailing pig. It has a central rod 42. At the leading end of the central rod there is a cylinder 72 of porous material dimensioned to contact the interior wall of the tubing 12. Behind this is a rigid cylindrical body 74 of smaller diameter than the tubing, then another porous cylinder 76 followed by a rigid and impermeable disc 78. The impermeable disc 78 provides a rigid rear face 80 so that pressure behind the pig can propel the pig and the slug of corrosion inhibiting composition along the tubing 12.

The porous cylinder 76 leaves a coating on the tube wall and the impermeable disc 78 has a diameter which is slightly less than the internal diameter of the tubing 12, so that it does not scrape away the coating left by the porous cylinder.

The corrosion inhibiting composition may contain a polymerisable corrosion inhibitor which is water soluble or may contain an inhibitor which is a water insoluble material.

Water-soluble organic corrosion inhibitor which contains polymerisable groups may be present in an amount from 2, 3 or 5 wt % up to 25 wt % or more. An example of such a material, commonly used as a corrosion inhibitor is propargyl alcohol.

Water-insoluble organic corrosion inhibitor which contains polymerisable groups may be present in an amount from 2, 3 or 5 wt % up to 25 wt % but may be present in greater amount because such a material can provide both the required water-insoluble hydrophobic material and the corrosion inhibitor which contains one or more polymerisable groups. Such a material may be present in an amount exceeding 50 wt % and could even provide the entirety of the composition.

The polymerisable group or groups in a corrosion inhibitor may be one or more of
(i) an acetylenic group (two carbons joined by a triple bond)
(ii) a cyano group (carbon and nitrogen joined by a triple bond), (iii) an alkenyl ketone or alkenyl aldehyde containing an olefinic double bond conjugated with the double bond of a keto group, thus providing a structure:

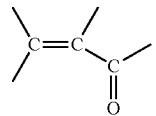

Examples of compounds containing an acetylenic group include acetylenic alcohols which are liquid at atmospheric pressure and have a structure containing at least 6 carbons atoms, and possibly from 6 or 8 to 18 carbon atoms, such as 5-methyl hex-1-yn-3-ol, 1-octyn-3-ol and 4-ethyl 1-octyn-3-ol.

An example compound containing a carbon-nitrogen triple bond (which may be termed a cyano or nitrile group) is cinnamonitrile.

Examples of alkenyl ketones are alkenyl phenones: e.g. 2-hydroxy-1-phenyl but-3-en-1-one, 3-methoxy-2-(methoxymethyl)-1-phenylpropan-1-one, 2-(methoxymethyl)-1-phenylprop-2-en-1-one, and phenylvinyl ketone. An example of an alkenyl aldehyde is trans-cinnamaldehyde.

A separate water-insoluble hydrophobic material in the corrosion inhibiting composition may be a material which does not contain any unsaturated groups or which contains olefinic groups. This may be present in an amount which is at least 25 wt % and may provide a balance of the composition up to 98 wt %. Such a material may have a boiling temperature at atmospheric pressure which is at least 100° C. so that it has low volatility and will not evaporate from a coating on metal. Such a material may be a hydrocarbon oil such as hexadecane or an ester such as methyl oleate or an amine with more than six carbon atoms such as hexadecylamine.

Examples of compounds containing olefinic groups are carboxylic acids and their esters where the carboxylic group contains unsaturation.

The corrosion inhibiting composition may possibly contain a solvent for the hydrophobic material and/or the polymerisible corrosion inhibitor. A solvent may be an organic compound and may be sufficiently volatile to evaporate from the coating after it has been deposited on metal. For instance it may have a boiling temperature below 100° C. at atmospheric pressure. Such a solvent may be a volatile water immiscible liquid such as hexane or may be a volatile water soluble (or water miscible) liquid such as isopropanol or methanol.

If a solvent is included in the corrosion inhibiting composition, the hydrophobic material and/or the polymerisible corrosion inhibitor may be liquids which are less volatile than the solvent. It is also possible that at least one of these materials, when pure, would not be a mobile liquid under ambient conditions but is in solution in the remainder of the composition. For instance, if a solvent is included in the composition, the hydrophobic material could be a wax.

If the corrosion inhibiting composition includes a solvent, this may be present in an amount up to 75 wt % but the amount may be less, such as not more than 50 wt %. If any water is present, the amount may be less than the amount of organic solvent, and as already mentioned may be not more than 20 wt % or 10 wt % of the composition.

Other materials may be included in the corrosion inhibiting composition. One possibility is a thickening agent, which may be an oil-soluble polymeric thickening agent, serving to increase the viscosity of the deposited inhibitor coating and so enhance its resistance to erosion by turbulent flow of the aqueous solution to which the coated metal is subsequently exposed. Another possibility is an agent to modify the wettability of the metal. This may be ionic and/or non-ionic surfactant to increase hydrophobicity of metal substrate thereby improving adsorption of the corrosion inhibiting coating. The composition may contain synergistic inhibitor additives, which may be heteroatom-containing aromatic molecules, to enhance the effectiveness of the polymerizable inhibitor(s) at high temperature. The composition may contain so-called intensifiers which are not themselves corrosion inhibitors but improve inhibition efficiency at high temperature. Examples of intensifiers are potassium iodide, iodine, other metal iodides and formic acid.

Some examples of corrosion inhibiting compositions are
A mixture (designated Cl/1) which is 7% propargyl alcohol, 60% hydrocarbon oily phase and 33% methanol;
A mixture containing 15% 4-ethyl 1-octyn-3-ol, 5% cinnamonitrile, 80% hydrocarbon oily phase;
A mixture containing 7% propargyl alcohol, 3% 4-ethyl 1-octyn-3-ol, 15% alkyl quaternary ammonium surfactants, 6% non-ionic surfactant, 40% involatile hydrocarbon oil, 29% water-soluble organic solvents boiling at less than 100° C.;
A mixture containing 33% 1-octyn-3-ol, 65% vegetable oil (a hydrophobic triglyceride) and 1% polybutadiene as an oil soluble thickener;
A mixture containing 30% 1-octyn-3-ol, 55% vegetable oil (a hydrophobic triglyceride) and 15% naphthylmethylquinolinium chloride (NMQCl)
A mixture containing 6% propargyl alcohol, 25% 1-octyn-3-ol, 39% mineral oil, 7% methanol, 15% naphthylmethylquinolinium chloride (NMQCl), and 8% formic acid as an intensifier.

After coating the metal surface with the corrosion inhibiting composition, the surface is contacted with aqueous solution which may be aqueous acidic solution having a pH of zero or less. It is possible that this aqueous solution does not contain any corrosion inhibitor. However, it is also possible that the aqueous solution may contain a low concentration of a corrosion inhibitor which contains polymerisable groups to maintain the protective coating on the metal surface. The aqueous solution may or may not contain a hydrophobic liquid. We have found that it is not necessary to include a hydrophobic oil in this aqueous solution, but there is also no necessity to exclude hydrophobic oil from it.

EXAMPLES

A number of experimental examples were carried out using steel test pieces in order to demonstrate the inhibition of corrosion by the method disclosed here.

Example 1 (Comparative)

This comparative example observed weight loss in a manner similar to conventional corrosion tests. Two steels were used in these tests:
HS80, a low carbon steel used to fabricate coiled tubing.
N80, a medium carbon steel used to fabricate casing.
Both of these steels have yield strength of about 80 kpsi.
Steel corrosion test coupons with surface area of 25-30 $cm^2$ were glass bead blasted to ensure a clean surface, measured to determine their exact surface area, weighed and then exposed to 100 mL of an acidic solution under pressure in a high temperature autoclave. The conditions were 121° C. (250° F.) and a pressure of 20.7 MPa (3000 pounds per square inch).

In this comparative example coupons were exposed to 15% HCl containing 0.1 wt. % of a corrosion inhibiting composition denoted Cl/1 (containing 7% propargyl alcohol, 60% hydrocarbon oily phase and 33% methanol) for 3 hours at 121° C. (250° F.). In further experiments the concentration of the corrosion inhibiting composition in the acid was increased. After the period of exposure to acid each test coupon was washed with demineralized water and allowed to dry. It was then weighed to determine the weight loss and a value for weight loss per unit area was calculated. The results obtained, which are each an average of two replicate tests, are given in the following table:

| Weight loss HS80 and N80 in 15% HCl; T = 121° C. | | | |
|---|---|---|---|
| | Cl/1 concentration | Weight loss after 3 hr. | |
| Metal | wt % | (lb/ft$^2$) | (gm/m$^2$) |
| HS80 | 0.1 wt % | 0.812 | 395 |
| N80 | 0.1 wt % | 0.046 | 225 |
| HS80 | 0.2 wt % | 0.012 | 58.6 |
| N80 | 0.2 wt % | 0.022 | 107 |
| HS80 | 0.5 wt % | 0.075 | 366 |
| N80 | 0.5 wt % | 0.015 | 73.2 |

Example 2

This example used test coupons as in Example 1, but the coupons were exposed to a corrosion inhibiting composition before exposure to acid.

The coupons were initially immersed in neat Cl/1 inhibitor composition (7% propargyl alcohol, 60% hydrocarbon oily phase and 33% methanol). The coupons were then hung on glass hooks allowing all the excess neat inhibitor liquid to drain from their surfaces. At least some of the volatile methanol could evaporate at this stage. After complete draining of the excess liquid, the coupons were weighed again. It was determined that the average weight of Cl/1 inhibitor that remained as an adherent coating on each coupon was 0.10±0.01 g. Using the known surface areas of the coupons it was calculated that the final average thickness of the inhibitor coating on the test coupons was 39±8 μm.

The coated coupons were then exposed to 100 ml acid for 3 hours in a high temperature autoclave under the same temperature and pressure conditions as in the previous example, namely 121° C. (250° F.) and 20.7 MPa (3000 pounds per square inch). This was exposure to 15 wt % HCl which did not contain any corrosion inhibitor.

If it is imagined that all the corrosion inhibitor from the test coupons came off and completely dispersed in the acid solution, the corrosion inhibitor composition concentration in the acid would have been 0.1 wt % (which is of course the same as a concentration mentioned in Example 1). However, the weight losses when exposed to 15% hydrochloric acid were lower than in Example 1 as shown in the following table.

Weight loss HS80 and N80 in 15% HCl (after applying coating), T = 121° C.

| Metal | Weight loss after 3 hr. | |
| --- | --- | --- |
| | (lb/ft$^2$) | (gm/m$^2$) |
| HS80 | 0.014 | 68.3 |
| N80 | 0.020 | 97.6 |

It will be appreciated from these figures that corrosion was greatly reduced, compared to exposure to acid containing 0.1 wt % Cl/1. This is evidence that the coating which had formed on the metal surface remained in place and inhibited corrosion.

Example 3

This example made use of electrochemical measurements to observe corrosion. All the electrochemical measurements were carried out in the potentiostatic mode using a three-electrode cell arrangement connected to an Autolab PGSTAT 302N Potentiostat The experiments were carried out in a corrosion cell which was a 0.5 litre glass container surrounded by a thermostatic water-jacket to maintain temperature at 80±1° C. The top of the glass container was fitted with a number of items projecting into the liquid in the container. These were a Metrohm Ag/AgCl (3M KCl) reference electrode, a graphite counter electrode, a thermometer and a gas two-way purge tube. The experiments were carried out in de-aerated acid solutions saturated with nitrogen. The volume of acid solution in the container was 300 mL. The temperature was maintained at 80±1° C. Nitrogen saturation was initiated 30 minutes prior to the tests and was continued throughout the experiment.

For each experiment, the working electrode was a rotating cylinder electrode of HS80 steel mounted on a polyether ether ketone (PEEK) sleeve attached to a Pine Research Instrumentation Company modulated speed rotator (model AFMSRCE). Experiments were performed at a rotation speed of 6000 rpm. Calculations indicate that when the electrode was rotated at 6000 rpm, the wall shear stress (50.15 Pa) was similar to the internal wall shear stress in coiled tubing with a 1 inch (2.54 cm) internal diameter when pumping an acid solution through it at 2 bbl/min. The calculated Reynolds number (1.5×10$^5$) indicates that flow adjacent to the rotating electrode surface was turbulent.

A fine Luggin capillary was placed close to the working electrode to minimize ohmic resistance effects. Magnetic stirring was used to provide an even temperature distribution and good mixing during each experiment.

Linear polarization resistance (LPR) measurements were carried out using a potential range ±10 mV with respect to the open circuit potential (OCP) and a scan rate of 0.2 mV s$^{-1}$. The polarization resistance ($R_p$) was determined from the slope of the potential versus the current. The Tafel slope (determined from potentiodynamic polarization tests) and the polarization resistance were used to calculate the corrosion current using the Stern-Geary equation:

$$i_{corr} = \frac{B}{R_p} = \frac{b_a b_c}{2.303(b_a + b_c)} \frac{1}{R_p}, \quad (1)$$

where $b_a$ and $b_c$ are the anodic and cathodic Tafel constants. Knowledge of $R_p$, $b_c$ and $i_{corr}$ enables a direct determination of the corrosion rate at any instant in time using the above equation 1. The corrosion current can be converted to weight loss per unit time using Faraday's law. In these experiments the corrosion potential was monitored every 30-180 seconds and the polarization resistance was measured every 20-30 minutes.

Potentiodynamic polarization tests were carried out after LPR experiments and served to determine the corrosion current ($i_{corr}$), OCP, and Tafel slopes of the cathodic ($b_c$) curve. These cathodic Tafel curves were obtained by changing the electrode potential automatically from OCP to −200 mV at a potential sweep rate of 1 mV s$^{-1}$. They were corrected for the Ohmic drop (0.35 Ohm), previously determined by electrochemical impedance measurements. The cathodic corrosion current was conventionally determined by extrapolation of the cathodic Tafel slope to the OCP.

Again, experiments were carried out using the Cl/1 corrosion inhibitor mixture.

In a comparative experiment, an HS80 rotating cylinder electrode was exposed to 4M hydrochloric acid containing 0.01 wt. % Cl/1 for six hours at 80° C.

For the coating experiment, 0.03 g Cl/1 was deposited evenly (using a micro-pipette) on the exposed surface of a replicate HS80 RCE. After this step, the coated RCE (rotating at 6000 rpm) was exposed to 4M hydrochloric acid for six hours at 80° C. No corrosion inhibitor was added to the acid, but it should be appreciated that if all the inhibitor coating had washed off the electrode surface and completely mixed with the acid, the Cl/1 concentration in the acid would be 0.03 g/300 mL=0.01 wt % as was used in the control experiment.

Figure 8:
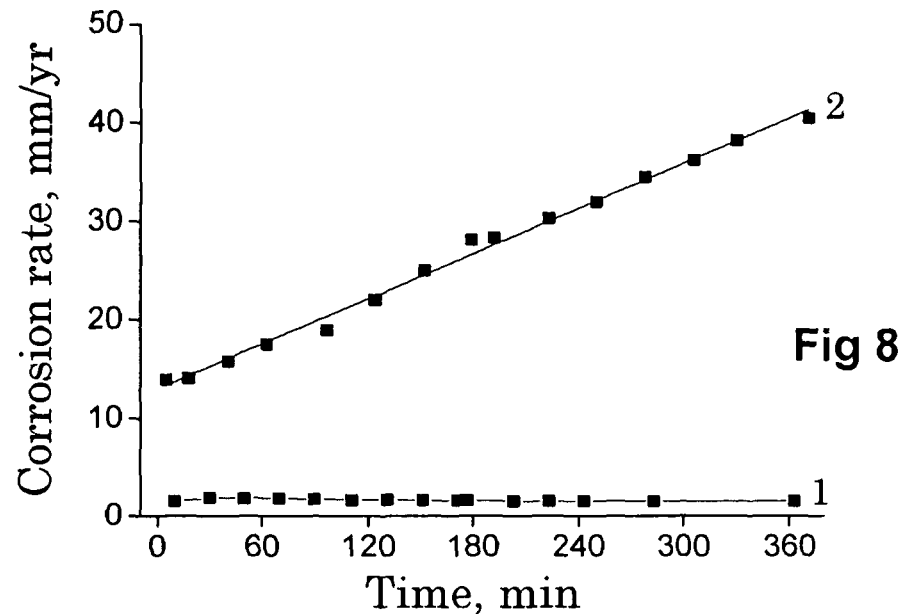
FIG. 8 shows corrosion rates measured in Example 3.

The results are shown graphically in FIG. 8. Results from the comparative experiment are shown as line 2 which shows that corrosion rate of HS80 in the presence of 0.01 wt. % Cl/1 increased with time from 14 mm/year at exposure time t=5 min to 40 mm/year at t=6 hours. In contrast, the results from the coating experiment (line 1) show that the applied coating of corrosion inhibitor resulted in a constant and significantly lower corrosion rate around 1.5 mm/year. This lower rate was maintained for at least six hours under the experimental conditions which were a realistic representation of wall shear stress and turbulent flow when pumping through coiled tubing.

Example 4

The electrochemical procedure of Example 3 was used to carry out another comparison. 1-octyn-3-ol has corrosion inhibiting properties because it is an acetylenic alcohol. It is also a hydrophobic liquid.

In a control experiment, an HS80 rotating cylinder electrode was exposed to 300 ml of 4M hydrochloric acid containing 0.015 gm 1-octyn-3-ol which is sufficient to give a concentration of 0.005 wt % in the acid. Rotation was at 6000 rpm as in Example 3 and exposure was for three hours at 80° C.

As a coating experiment, 0.015 gm, (i.e. the same quantity) of 1-octyn-3-ol was deposited evenly (using a micro-pipette) on the exposed surface of another, identical HS80 rotating cylinder electrode. The calculated average thickness of the coating was 123 micrometers. After this step, the coated electrode (rotating at 6000 rpm) was exposed to 300 ml of 4M hydrochloric acid for three hours at 80° C. It was assumed that some of the 1-octyn-3-ol washed off the electrode into the acid, but no other corrosion inhibitor was added to the acid.

Figure 9:
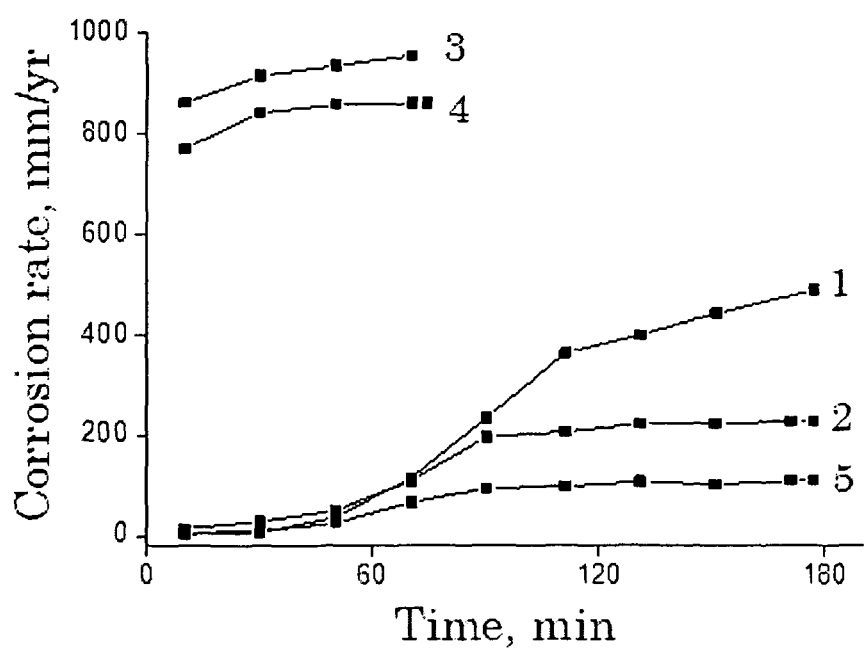
FIG. 9 shows corrosion rates measured in Examples 4, 5 and 6.

In both cases the rate of corrosion was observed as in Example 3 and the results are shown as curves 1 and 2 in FIG. 9. In the control experiment, having results plotted as curve 1, the corrosion rate rose to 490 mm/year after 3 hours, which is a low inhibition efficiency. In the coating experiment, having results plotted as curve 2, the corrosion inhibiting efficiency was better, at 229 mm/year after three hours. This improvement was attributed to the 1-octyn-3-ol which remained as a coating on the electrode before the electrode was exposed to acid. Thus, corrosion inhibition is provided by the application of an inhibitor coating liquid composed entirely of the oil-soluble acetylenic alcohol 1-octyn-3-ol.

Example 5

The electrochemical procedure of Example 3 was used to carry out a further comparison. Three coating compositions were used.

For one experiment the composition applied to an electrode was 0.045 g linseed oil. Linseed oil is a hydrophobic triglyceride in which the approximate content of constituent carboxylic acids is:
  51-55% α-linolenic acid (all-cis-9,12,15-octadecatrienoic acid),
  7% palmitic acid (hexadecanoic acid, no olefinic unsaturation)
  4% stearic acid (octadecanoic acid, no olefinic unsaturation),
  18-23% oleic acid (cis-octadec-9-enoic acid) and
  14-17% linoleic acid (all-cis-9,12-Octadecadienoic acid).

For a second experiment the composition applied to an electrode was 0.045 g linseed oil thickened with 1 wt % of an oil-soluble polymer which was polybutadiene.

For a third experiment, the composition was 0.015 g 1-octyn-3-ol mixed with 0.30 gm linseed oil and 1 wt % polybutadiene.

For each of these experiments the composition was deposited evenly (using a micro-pipette) on the exposed surface of an HS80 rotating cylinder electrode. Then the coated electrode (rotating at 6000 rpm) was exposed to 300 ml of 4M hydrochloric acid for three hours at 80° C. The rate of corrosion was observed as in Example 3 and the results are included in FIG. 9 as curves 3, 4 and 5 respectively. Comparison of curves, 1, 2, 3 and 4 shows that linseed oil alone is not an effective corrosion inhibitor when applied as a coating in this way and the results are only slightly improved by the addition of the thickening agent polybutadiene. In contrast, curve 5 shows that the inhibitor coating mixture containing 33 wt % 1-octyn-3-ol and 67 wt % linseed oil (thickened with 1 wt. % polybutadiene) creates a persistent film such that the corrosion rate reaches a plateau rate around 111 mm/year after 3 hours exposure.

It will be appreciated that the embodiments described in detail and/or exemplified above can be modified and varied within the scope of the concepts which they exemplify. Features referred to above or shown in individual embodiments above may be used together in any combination as well as those which have been shown and described specifically. Accordingly, all such modifications are intended to be included within the scope of this disclosure.

The invention claimed is:

1. A method of inhibiting corrosion of metal in contact with an acidic aqueous solution comprising:
  contacting the metal with a corrosion inhibiting composition comprising the following organic corrosion inhibiting constituents:
    a water-insoluble hydrophobic material; and
    a corrosion inhibitor which contains one or more polymerisable groups containing double or triple bonded carbon;
      the corrosion inhibiting composition containing more than 30% by weight of the water-insoluble hydrophobic material and the corrosion inhibitor, such that the corrosion inhibiting constituents provide both corrosion inhibitor and hydrophobic liquid, so as to form a coating of the composition on the metal surface, and
  subsequently contacting the coating on the metal surface with the acidic aqueous solution which creates a polymerized hydrophobic film on the metal surface; wherein the acidic aqueous solution comprises a corrosion inhibitor which serves to maintain the polymerized hydrophobic film.

2. The method according to claim 1 wherein the water-insoluble hydrophobic material is a water-insoluble hydrophobic oil.

3. The method according to claim 1 wherein the water-insoluble hydrophobic material is the corrosion inhibitor which contains one or more polymerisable groups.

4. The method according to claim 1 wherein the corrosion inhibiting composition contains:
  at least 25% by weight of the water-insoluble hydrophobic material;
  at least 2% by weight of the corrosion inhibitor which contains one or more polymerisable groups;
  0 to 70% by weight of an organic solvent having a boiling temperature, at atmospheric pressure, of less than 100° C.; and
  0 to 10% by weight of water.

5. The method according to claim 1 wherein the polymerisable groups are selected from a group consisting of: (i) an acetylenic group; (ii) a cyano group; and (iii) an alkenyl keto group containing an olefinic double bond conjugated with the double bond of a keto group.

6. The method according to claim 1 wherein the one or more polymerisable groups is an acetylenic alcohol.

7. The method according to claim 1 wherein the water-insoluble hydrophobic material is a hydrocarbon or an ester.

8. The method according to claim 7 wherein the water-insoluble hydrophobic material contains olefinic unsaturation.

9. The method according to claim 1 wherein contacting the metal with the corrosion inhibiting composition comprises exposing the metal to a volume of the composition greater than that which forms the coating composition and then removing the surplus composition.

10. The method according to claim 1 wherein the aqueous solution is an aqueous acidic solution having a pH of zero or less.

11. The method according to claim 1 wherein contacting the coating on the metal surface with the aqueous solution takes place not more than 4 hours after forming the coating on the metal.

12. The method according to claim 1 wherein the metal is steel tubing and a slug of the corrosion inhibiting composition which fills the cross section of the tubing is propelled along the tubing.

13. The method according to claim 12 wherein the slug of the corrosion inhibiting composition is propelled along the tubing with a pig at the trailing end of the slug.

14. The method according to claim 12 wherein the slug of the corrosion inhibiting composition is propelled along the tubing with a pig at the leading end of the slug.

15. The method according to claim 12 wherein the slug of the corrosion inhibiting composition is propelled along the tubing by pressure of liquid or gas pumped into the tubing behind the slug.

16. The method according to claim 1 wherein the corrosion inhibiting composition contains:
   at least 25% by weight of the water-insoluble hydrophobic material;
   at least 2% by weight of the corrosion inhibitor which contains the one or more polymerisable groups;
   0 to 50% by weight of an organic solvent having a boiling temperature, at atmospheric pressure, of less than 100° C.; and
   0 to 10% by weight of water.

* * * * *